United States Patent
Jameson (10) Patent No.: US 10,441,914 B2
(45) Date of Patent: Oct. 15, 2019

(54) RADIAL AIR PURIFICATION SYSTEM FOR REMOVAL OF CONTAMINANTS FROM A GAS AND METHODS OF FABRICATION

(71) Applicant: Pure Air Filtration, LLC, Norcross, GA (US)

(72) Inventor: Kevin F. Jameson, Norcross, GA (US)

(73) Assignee: Pure Air Filtration, LLC, Norcross, GA (US)

(*) Notice: Subject to any disclaimer, the term of this patent is extended or adjusted under 35 U.S.C. 154(b) by 123 days.

(21) Appl. No.: 15/806,410

(22) Filed: Nov. 8, 2017

(65) Prior Publication Data
US 2018/0126321 A1 May 10, 2018

Related U.S. Application Data

(60) Provisional application No. 62/419,998, filed on Nov. 10, 2016.

(51) Int. Cl.
*B01D 53/02* (2006.01)
*B01D 53/04* (2006.01)
*B01J 20/28* (2006.01)

(52) U.S. Cl.
CPC ...... *B01D 53/0431* (2013.01); *B01J 20/2805* (2013.01); *B01D 2253/102* (2013.01); *B01D 2253/104* (2013.01); *B01D 2253/25* (2013.01); *B01D 2257/106* (2013.01); *B01D 2257/2047* (2013.01); *B01D 2257/302* (2013.01); *B01D 2257/304* (2013.01); *B01D 2257/404* (2013.01); *B01D 2257/502* (2013.01); *B01D 2257/708* (2013.01); *B01D 2257/7025* (2013.01); *B01D 2257/7027* (2013.01); *B01D 2258/0283* (2013.01)

(58) Field of Classification Search
CPC ........ B01D 2253/102; B01D 2253/104; B01D 2253/25; B01D 2257/2047; B01D 2257/302; B01D 2257/304; B01D 2257/404; B01D 2257/502; B01D 2257/7025; B01D 2257/7027; B01D 2257/708; B01D 2258/0283; B01D 53/0431; B01J 20/2805
See application file for complete search history.

(56) References Cited

U.S. PATENT DOCUMENTS

| | | | | |
|---|---|---|---|---|
| 5,133,500 A | * | 7/1992 | Simpson | A01M 7/0082 239/150 |
| 5,824,232 A | * | 10/1998 | Asher | B01D 29/21 210/787 |
| 2008/0053888 A1 | * | 3/2008 | Ellis | B01D 36/003 210/338 |
| 2012/0040114 A1 | * | 2/2012 | Chen | F16L 11/125 428/34.5 |
| 2012/0132581 A1 | * | 5/2012 | Williams | B01D 35/10 210/340 |

* cited by examiner

*Primary Examiner* — Christopher P Jones
(74) *Attorney, Agent, or Firm* — Thomas Horstemeyer, LLP (57) ABSTRACT

A radial air purification system, a method of forming the purification system, and methods of removing at least one contaminant from a gas using the purification system are provided. The radial air purification system includes adsorbent media tubular supports that are fabricated using a fiberglass grating structure to provide increased strength, corrosion resistance, reduction in weight, and lower fabrication costs.

22 Claims, 8 Drawing Sheets

RADIAL AIR PURIFICATION SYSTEM FOR REMOVAL OF CONTAMINANTS FROM A GAS AND METHODS OF FABRICATION

CROSS-REFERENCE TO RELATED APPLICATIONS

This application claims the benefit of U.S. Provisional Patent Application Ser. No. 62/419,998, filed Nov. 10, 2016, entitled "RADIAL AIR PURIFICATION SYSTEM FOR REMOVAL OF CONTAMINANTS FROM A GAS AND METHODS OF FABRICATION," which is incorporated by reference herein in its entirety.

FIELD OF THE INVENTION

The present invention generally relates to an air purification system and method. In particular, the present invention relates to a radial flow air purification system having an improved structure for holding adsorbent media therein for the removal of one or more contaminants from a gas feed.

BACKGROUND

Air pollution is a serious issue facing many parts of the world today. Common pollutants include particulates, biological molecules, and other harmful materials that can lead to allergies, disease, death, and damage to the ecosystem. These pollutants can be the result of either natural or human actions. Some natural actions that produce pollutants include forest fires, volcanic eruptions, pollen dispersal, evaporation of organic compounds and natural radioactivity. However, industrial processes and motor vehicle exhaust—human actions—are currently the primary cause of air pollution.

Gaseous pollutants include sulfur oxides ($SO_x$), nitrogen oxides ($NO_x$), ozone ($O_3$), carbon monoxide (CO), volatile organic compounds (VOC), hydrogen sulfide ($H_2S$), and hydrogen fluoride (HF). These are mainly emitted from fossil fuel fired power plants, smelters, industrial boilers, petroleum refineries, and manufacturing facilities. Oxidation of sulfur oxides, particularly $SO_2$, can result in the formation of $H_2SO_4$ which causes acid rain. $NO_2$ and CO are problematic toxic gases. Some volatile organic compounds (VOCs) are dangerous to human health or cause harm to the environment. For example, methane and other hydrocarbon VOCs are greenhouse gases which increase global warming. Benzene, toluene and xylene, which are non-methane VOCs, are believed to be carcinogens and can cause leukemia with prolonged exposure.

With industrial processes and motor vehicle exhaust being the primary producers of air pollutants, it is increasingly important to the treat output airstreams to remove these pollutants before they are released into the atmosphere. In addition, it is further vital to treat polluted air within our environment, for example, in our homes and places of work, to reduce the level of pollutants that we inhale continuously.

Air purification systems are well known devices which take an input air stream and pass it through a filter media to remove targeted pollutants. However, given the tremendous problem that we face today with the quality of our air, there is a continuous move to provide higher performance air filters.

SUMMARY OF INVENTION

Aspects of the present invention are directed to a radial air purification system for the removal of one or more contaminants from a gas stream, a method of forming the purification system, and methods of removing at least one contaminant from a gas using the purification system.

According to one aspect, the present invention provides a radial gas purification system comprising a hollow cylindrical housing having a circular base at a bottom, a circular lid at a top, and a side extending therebetween; a gas inlet in a side of the hollow cylindrical housing for feeding gas into the housing; a first outer tubular support disposed concentrically within the housing; a second inner tubular support disposed concentrically within the first outer tubular support; an adsorbent media space disposed between the first outer tubular support and the second inner tubular support; and a purified gas outlet extending within the second inner tubular support and upwards through the lid. The first outer tubular support and the second inner tubular support can each comprise at least one fiberglass grating formed into a circular shape to form a tubular structure, each of the at least one fiberglass grating comprising a first set of bars and a second set of bars, the first and second set of bars being interlaced, the first set of bars running parallel to eachother, and the second set of bars running parallel to eachother; and a porous layer disposed along an inner circumference of the tubular structure, along an outer circumference of the tubular structure, or along both an inner and outer circumference of the tubular structure.

Embodiments according to this aspect can include one or more of the following features. The first outer tubular support comprises at least two pultruded fiberglass gratings, each pultruded fiberglass grating formed into a semicircular shape, with two semicircular shaped pultruded fiberglass gratings connected to form a first tubular structure. The second inner tubular support comprises at least two pultruded fiberglass gratings, each pultruded fiberglass grating formed into a semicircular shape, with two semicircular shaped pultruded fiberglass gratings connected to form a second tubular structure. The fiberglass gratings are pultruded, the first set of bars are I-bars, and the second set of bars are bearing bars. The first set of bars are I-bars, and the second set of bars are bearing bars. The first outer tubular support comprises a flat pultruded fiberglass grating having the first set of bars extending perpendicular to the second set of bars, the flat pultruded fiberglass grating being bent into the circular shape. The second inner tubular support comprises a flat pultruded fiberglass grating having the first set of bars extending perpendicular to the second set of bars, the flat pultruded fiberglass grating being bent into the circular shape. The fiberglass gratings are pultruded, the first set of bars are I-bars, and the second set of bars are bearing bars. The pultruded fiberglass gratings are bent along a length of the bearing bars.

According to another aspect, the present invention provides a tubular support for supporting adsorbent media within a radial air purification system comprising at least one fiberglass grating formed into a circular shape to form a tubular structure, the fiberglass grating comprising a first set of bars and a second set of bars, the first and second set of bars being interlaced, the first set of bars running parallel to each other, and the second set of bars running parallel to each other; and a porous layer disposed along an inner circumference of the tubular structure, along an outer circumference of the tubular structure, or along both an inner and outer circumference of the tubular structure.

Embodiments according to this aspect can include one or more of the following features. The tubular support comprises at least two pultruded fiberglass gratings, each pultruded fiberglass grating formed into a semicircular shape, with two semicircular shaped pultruded fiberglass gratings connected to form a tubular structure. The tubular support comprises a plurality of two semicircular shaped pultruded fiberglass gratings connected to form a length of stacked tubular structures. The fiberglass gratings are pultruded, the first set of bars are I-bars, and the second set of bars are bearing bars. The first outer tubular support comprises a flat pultruded fiberglass grating having the first set of bars extending perpendicular to the second set of bars, the flat pultruded fiberglass grating being bent into the circular shape. The first set of bars are I-bars, and the second set of bars are bearing bars. The pultruded fiberglass grating is bent along a length of the bearing bars.

According to another aspect, the present invention provides a method of forming a tubular support for supporting adsorbent media within a radial air purification system comprising forming at least one fiberglass grating into a circular shape to form a tubular structure, the fiberglass grating comprising a first set of bars and a second set of bars, the first and second set of bars being interlaced, the first set of bars running parallel to each other, and the second set of bars running parallel to each other; and disposing a porous layer along an inner circumference of the tubular structure, along an outer circumference of the tubular structure, or along both an inner and outer circumference of the tubular structure.

Embodiments according to this aspect can include one or more of the following features. The fiberglass grating is formed by pultrusion. The first set of bars are formed into I-bars, a plurality of holes are formed within the I-bars, and the second set of bars are inserted through the plurality of holes. At least two pultruded fiberglass gratings are formed into a semicircular shape, and pairs of semicircular pultruded fiberglass gratings are connected to form the tubular structure. The step of forming at least one fiberglass grating into a circular shape comprises forming a flat pultruded fiberglass grating having the first set of bars extending perpendicular to the second set of bars, and bending the flat pultruded fiberglass grating into the circular shape. The first set of bars are I-bars and the second set of bars are bearing bars, and the flat pultruded fiberglass grating is bent into the circular shape along the length of the bearing bars.

Other aspects, embodiments and advantages of the present invention will become readily apparent to those skilled in the art are discussed below. As will be realized, the present invention is capable of other and different embodiments without departing from the present invention. Thus the following description as well as any drawings appended hereto shall be regarded as being illustrative in nature and not restrictive.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principals of the invention. The components in the drawings are not necessarily to scale, emphasis instead being placed upon clearly illustrating the principles of the present invention. In the drawings, each like component is referenced by a like numeral. For purposes of clarity, every component may not be labeled in every drawing. In the drawings.

DETAILED DESCRIPTION OF THE INVENTION

According to the present invention, a radial air purification system is provided for the removal of one or more contaminants from an input air or gas stream. In particular, the present system provides an improved support structure holding adsorbent media within the purification system. Unlike other air purification system designs, the of the present invention radial flow filters eliminate the need for compressors, vacuum units, high pressure seals, and the like due to operating conditions at or near ambient pressure.

Figure 1A:
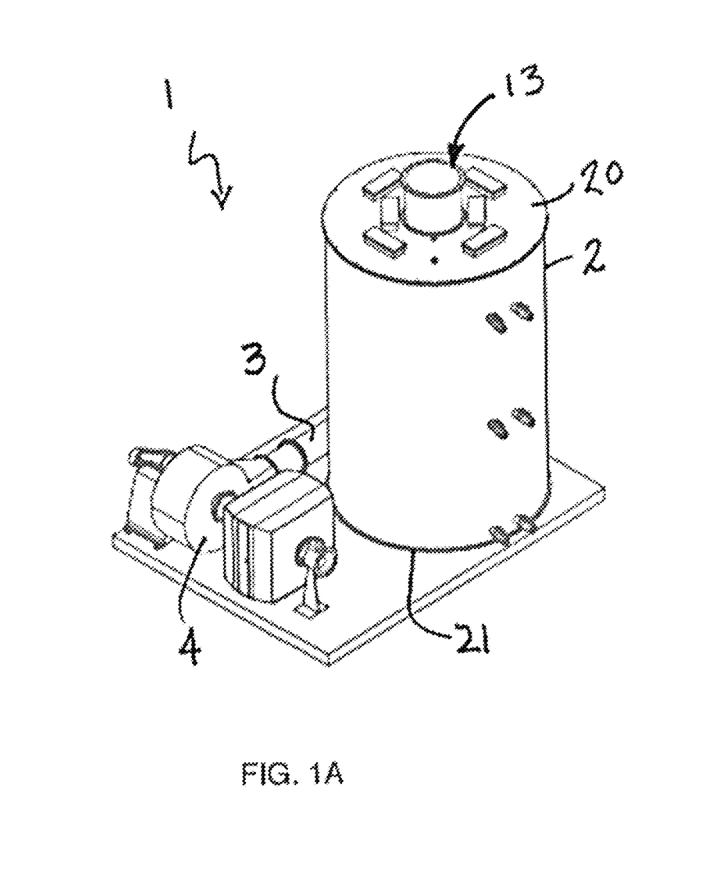
FIGS. 1A-C illustrate a radial air purification system according to one embodiment of the present invention, with FIG. 1A showing a perspective view, FIG. 1B showing a cut-away view and FIG. 1C showing a cross-sectional view.
Figure 1B:
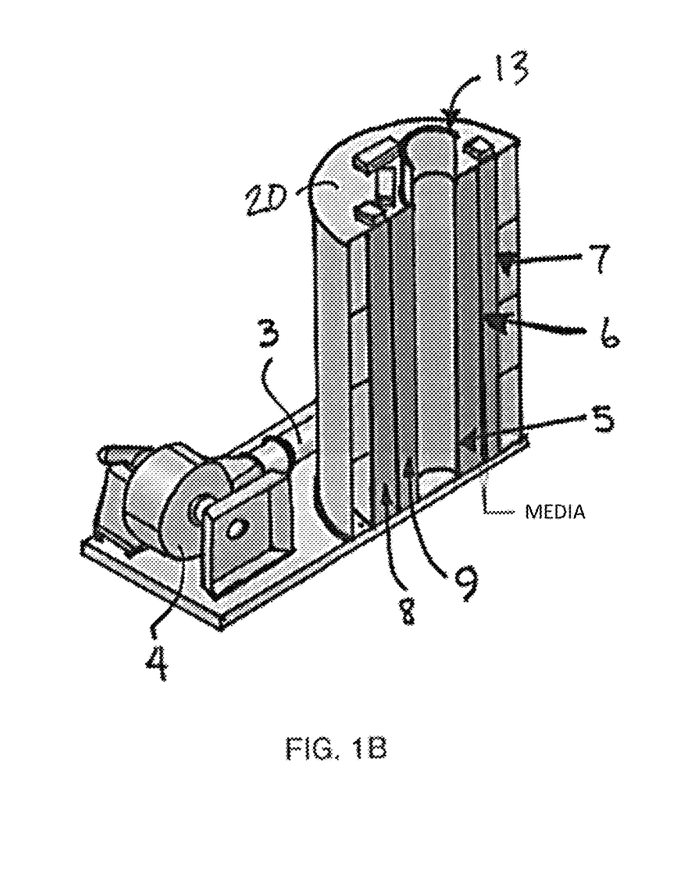
Figure 1C:
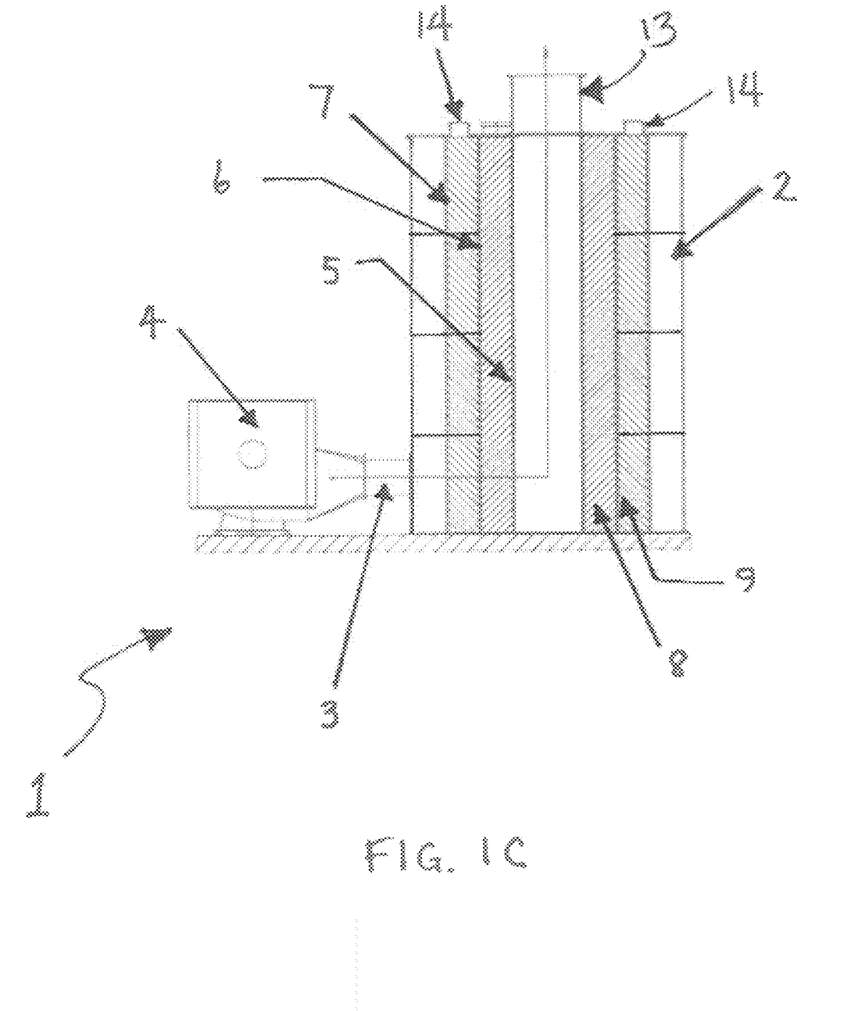

As shown in FIGS. 1A-C, one embodiment of the present invention radial air purification system 1 includes a cylindrical housing 2, a gas inlet tube 3 in communication with the interior of the housing 2, a fan 4 in communication with the gas inlet tube 3 for directing contaminated gas through the gas inlet tube 3 and into the housing 2, and a plurality of cylindrical support tubes of varying diameter (e.g., an inner support tube 5 having a smallest diameter, a middle support tube 6 having a larger diameter than the inner support tube 5, and an outer support tube 7 having a larger diameter than the middle support tube 6) disposed concentrically within the housing 2. One or more types of adsorbent media (e.g., outer adsorbent media 8 and inner adsorbent media 9) are then held within the housing 2 in the spaces between the plurality of support tubes (e.g., support tubes 5, 6, 7).

Figure 2:
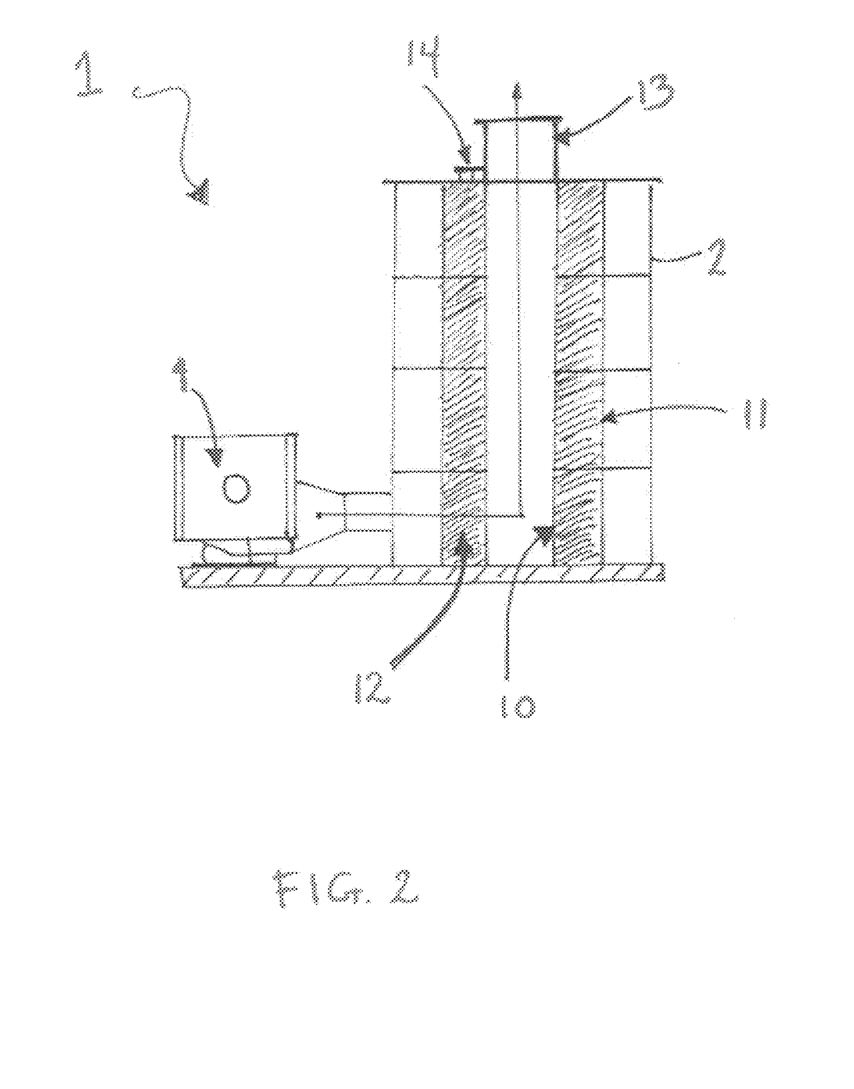
FIG. 2 is a cross-sectional view of a radial air purification system according to another embodiment of the present invention

It is noted that while FIGS. 1A-C depict three support tubes 5, 6, 7 with one outer layer or area of adsorbent media 8 disposed between an outer support tube 7 and a middle support tube 8, and one inner layer or area of adsorbent media 9 disposed between the middle support tube 8 and an inner support tube 9, the present invention is not limited to this specific arrangement. Rather, any number of support tubes can be provided with any number of layers or areas of adsorbent media disposed between two adjacent support tubes. For example, according to another embodiment of the present invention, as shown in FIG. 2, a radial air purification system 1 can be provided with only two support tubes (an inner support tube 10 and an outer support tube 11), and only a single layer or area of adsorbent media 12 disposed between the two support tubes 10, 11. In addition, three or more layers or areas of adsorbent media could also be provided by including additional support tubes within the housing 2, if desired. However, the most typical designs will include either three support tubes 5, 6, 7 with two layers or areas of adsorbent media 8, 9 (such as that depicted in FIGS. 1A-C) or two support tubes 10, 11 with one layer or area of adsorbent media 12 (such as that depicted in FIG. 2).

As with conventional radial purification systems, the walls of the support tubes (e.g., 5, 6, 7, 10, 11) have pores through which the gas stream passes. These pores, however, are generally not large enough to allow the adsorbent media to pass therethrough. During use, a gas stream is fed through the gas inlet tube 3 and into the housing 2. This may be facilitated by the fan 4 or using any conventional gas feed apparatus conventionally used in air purification systems. Once the gas stream enters the housing 2, it generally passes along an outer space between the housing 2 wall and the outermost support tube (e.g., 7 in FIG. 1C or 11 in FIG. 2) where it encounters the porous walls of the outermost support tube 7, 11 and passes through the porous walls and into the outermost layer or area of adsorbent media (e.g., 8 in FIG. 1C or 12 in FIG. 2). The gas stream then circulates through the outermost layer or area of adsorbent media 8, 12 where contaminants are filtered out of the gas stream. If there is no second area or layer of adsorbent media, for example as depicted in FIG. 2, then the purified gas stream passes through a second innermost support tube 10 where it passes through porous walls of the support tube 10 and upwards out an exit tube 13. If there is a second area or layer of adsorbent media, for example as depicted in FIG. 1C, then the purified gas stream passes through porous walls of the middle support tube 6 and into an inner layer or area of adsorbent media 9. The gas stream then circulates through the inner layer or area of adsorbent media 9 where additional contaminants are filtered out of the gas stream. If additional layers or areas of adsorbent media are present, then the above general process is repeated until the gas stream has passed through all of the layers or areas of adsorbent media. The purified gas stream then passes through the innermost support tube 10 where it passes through porous walls of the support tube 10 and upwards out an exit tube 13.

The adsorbent media contained within the present air purification system 1 can be selected from any conventional adsorbent media. The type of adsorbent media can, if desired, be selected so as to filter out particular target pollutants depending on where the air purification system will be used and the types of pollutants present in that environment. For example, some conventional adsorbent media types include, but are not limited to, activated alumina, sodium permanganate, activated carbon, impregnated carbon, and potassium permanganate, and various combinations thereof (e.g., in blends and/or impregnated forms such as alumina impregnated with potassium permanganate). In addition media such as foam and reticulated foam could alternatively be used, of desired. One skilled in the art could select the appropriate type of adsorbent media based on the end use. In addition, any of the conventional adsorbent media can be in any variety of conventional forms such as, but not limited to, granules, pellets, flakes, powders, etc. having either a regular or irregular shape and provided in any desired size. If desired, a combination of various shapes and sizes of adsorbent media can be provided in a single adsorbent layer or area, or a uniform shape and size of adsorbent media can be provided. In addition, when the air purification system 1 contains a plurality of adsorbent media layers or areas separated by tubular supports, the adsorbent media in multiple layers or areas may be the same or may differ. For example, (a) an activated carbon media in pellet form having size "x" can be provided in every single layer or area of adsorbent media, (b) an activated carbon media in pellet form having size "x" can be provided in one layer or area of adsorbent media while an activated carbon media in pellet form having size "y" can be provided in another layer or area of adsorbent media, (c) an activated carbon media can be provided in one area or layer of adsorbent media while an activated alumina media can be provided in another layer or area of adsorbent media, with the shapes and sizes of the two media being the same or different.

As shown in FIGS. 1C and 2, one or more media inlets 14 may be provided in an upper surface of the housing 2, such as in a lid 20 of the housing for inserting the adsorbent media into the air purification system 1 prior to its first use, as well as adding additional adsorbent media to the air purification system 1 as needed. The media inlets 14 can be in any form that allows for insertion of the media such as, for example, a simple hole in the lid 20 with a cap that is snapped on, twisted on, press-fitted on, etc., a short tube extending from the lid 20 with a cap thereon, etc. In addition, while the figures show the adsorbent media as completely filling the spaces between the tubular supports from a bottom or base 21 of the housing 2 of the space to a top of the housing 2 (e.g., up to the lid 20), the present invention is not limited as such, and it is also possible to only fill a portion of these spaces up (i.e., filling the space so that an upper level is somewhere below the lid 20 of the housing).

According to embodiments of the present invention, the tubular supports 5, 6, 7, 10, 11 are formed so as to address deficiencies with prior radial filter designs, which is primarily the lack of maintaining structural integrity as the air purification system increases in size and handles larger gas streams and greater volumes of contaminants. In particular, the present tubular supports 5, 6, 7, 10, 11 are formed to have an increased strength without becoming too bulky—and, thus, taking up too much space within the housing 2—and without becoming too heavy. This is accomplished by providing the tubular supports 5, 6, 7, 10, 11 in the general shape of a grating-like structure that has been formed or bent into a circular or semicircular shape. In particular, grating structures are typically flat structures comprising interlaced beams, bars, and/or rods that form a checkerboard-like pattern. These grating structures are typically used in a variety of applications including walkways and overhead platforms. According to embodiments of the present invention, if individual grating structures are formed or bent into a semicircular structure, then pairs of semicircular grating structures connected to form the tubular supports 5, 6, 7, 10, 11.

According to a preferred embodiment, the tubular supports 5, 6, 7, 10, 11 are fabricated from modified fiberglass gratings, or are fabricated using a technique similar to that of manufacturing fiberglass gratings. Fiberglass gratings generally comprise a composite material manufactured by combining a matrix of resin and fiberglass. Such materials and structures are beneficial because of their high strength, corrosion resistance, lightness in weight, and long operating lifespan. These properties, along with the high strength-to-weight ratio of fiberglass gratings makes them optimal for use as support elements (as is or in a modified form), such as the present tubular supports. Fiberglass grating structures are generally either formed by molding techniques or pultrusion techniques.

Figure 3:
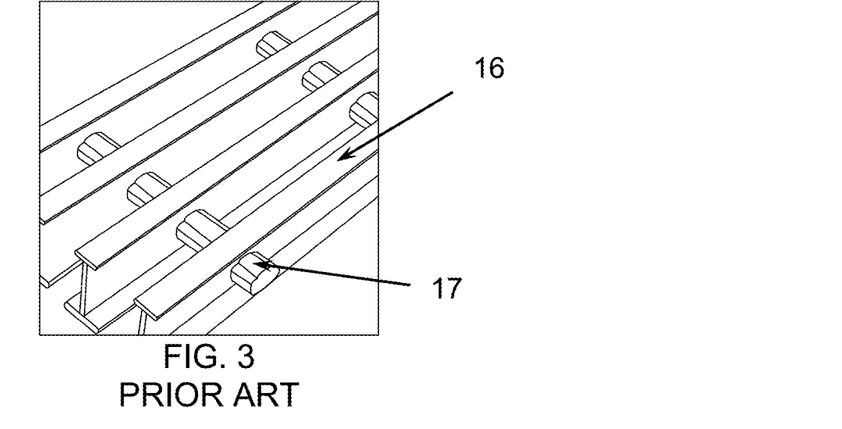
FIG. 3 is a perspective view of a prior art pultruded fiberglass grating structure.
Figure 4:
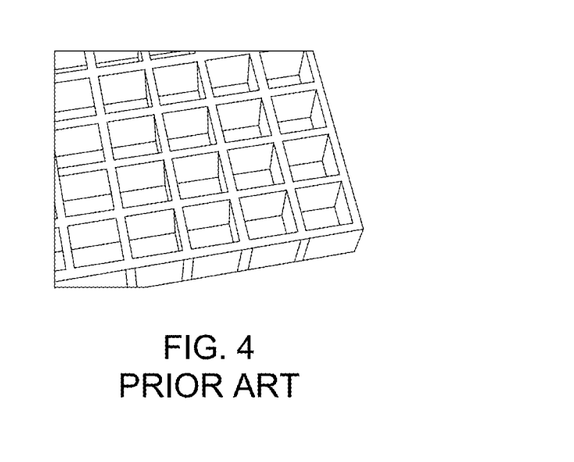
FIG. 4 is a perspective view of a prior art molded fiberglass grating structure.

FIG. 3 depicts a conventional structure for a pultruded fiberglass grating 15, which generally is in the form of interlaced fiberglass bars. More specifically, a typical structure includes load I-bars 16 running in a first direction, and bearing bars 17 running perpendicular to and through the I-bars. Pultruded gratings are formed by gripping raw materials are pulling them through the process steps until the desired finished shape is achieved (typically an I-bar shape), followed by dipping in a resin bath, wrapping in a synthetic veil material, and heating. Such a pultrusion process forms continuous glass strands encased in resin and wrapped in a surfacing veil. The veil protects the fibers and allows resin to saturate the outside of the glass strands as well as penetrating between the glass fibers. The resulting structure is smooth and corrosion resistant, with a higher glass/resin ratio than molded products. In order to form the interlaced structure, holes are formed in a plurality of the I-bars 16 (e.g., by cutting, machining, or drilling) and then bearing bars 17 are pressed through the holes. The bearing bar 17 can then be secured with epoxy or the like to form the grating structure.

Molded fiberglass grating structures offer high impact strength and chemical resistance. Molded fiberglass gratings are formed by placing layer after layer of liquid resin and fiberglass in a mold to produce the desired thickness and dimensions. The mold is then cured and the grating removed from the mold. Such molded gratings are one piece structures, meaning that there is no joint between the interlaced bars as in pultruded grating structures. The resulting structure is a mesh-like structure, such as that shown in FIG. 3B. The mesh can have a square-like grid structure as shown, or a rectangular-like grid structure.

Both the pultruded and molded fiberglass grating structures provide for high strength which allows for their use in applications such as walkways and overhead platforms, which must withstand the weight of multiple people and/or machinery and other structures. In order to provide the grating structures in a tubular configuration, which requires bending of the grating structures into a curved shape, the structure is modified so that the grating is bendable along one axis. This can be accomplished in any manner that reduces the strength of the bars along one axis.

According to preferred embodiments, the tubular supports 5, 6, 7, 10, 11 are fabricated using a pultruded fiberglass grating structure in which the spacing between the I-bars 16 and/or the spacing and diameter of the bearing bars 17 is increased so as to allow for bending of the grid structure. As a result, the grating structure can then be bent along the length of the bearing bar 17 into a curved structure, such as a semicircular or even circular form. According to particularly preferred embodiments, a single grating structure is formed and bent into a semicircular form, which is combined with a second grating structure that has also been bent into a semicircular form to form a combined tubular shape.

Figure 5A:
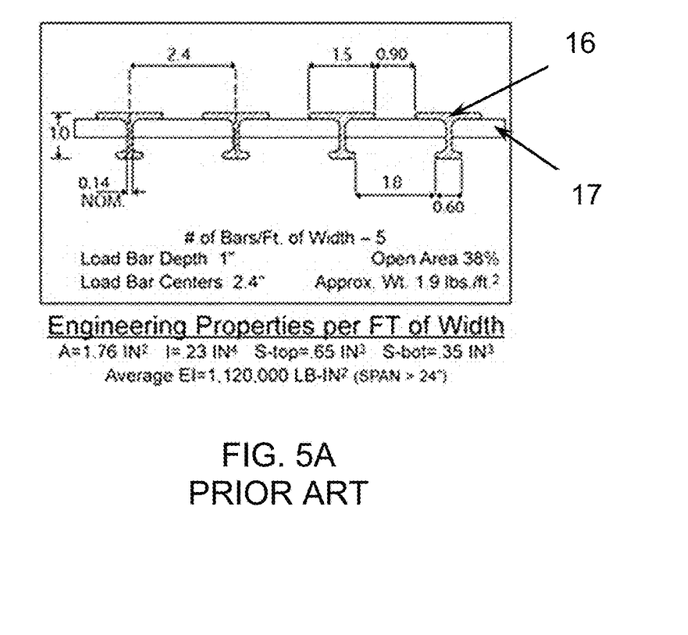
FIGS. 5A-B illustrate a cross-sectional view of two prior art pultruded fiberglass grating structures, as viewed along the I-bar axis, with FIG. 3A depicting a bearing bar depth of 1" and FIG. 3B depicting a bearing bar depth of 1.5".
Figure 5B:
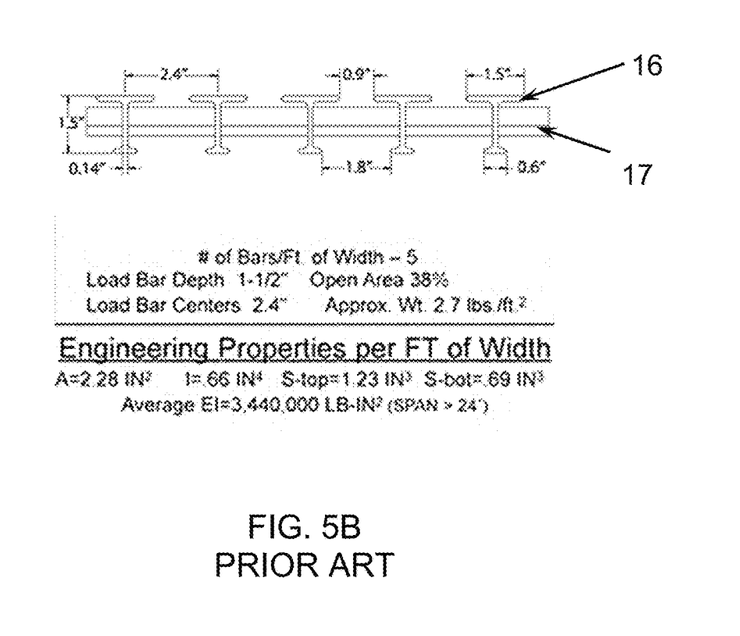

Two examples of prior art pultruded fiberglass gratings are depicted in FIGS. 5A-B, with FIG. 5A depicting a bearing bar depth of 1" and FIG. 3B depicting a bearing bar depth of 1.5". As shown, the I-bars 16 are positioned 2.6" away from each other (as measured from their center points.

Figure 7A:
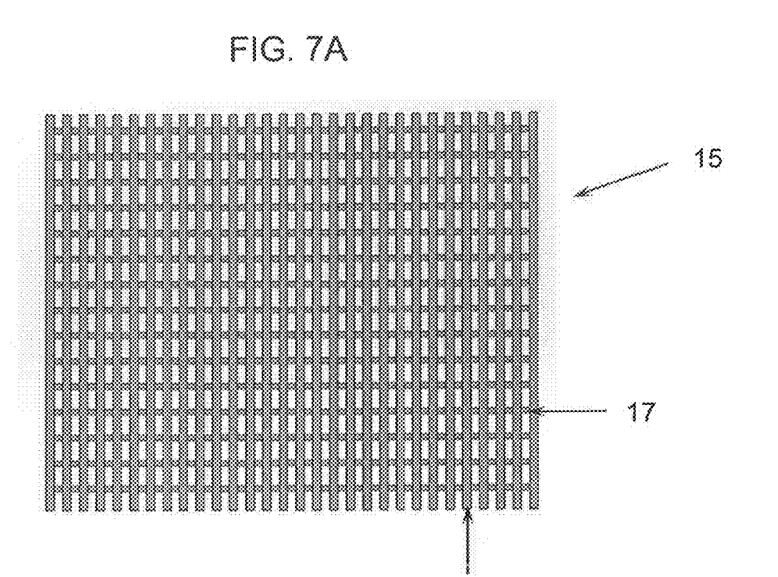
FIGS. 7A-C illustrates a perspective view of a tubular support of the air purification system according to one embodiment of the present invention, with FIG. 7A depicting a flat grating structure for use in forming a tubular support, FIG. 7B depicting the grating structure bent into a curved shape, and FIG. 7C depicting a tubular support formed of a plurality of curved grating structures combined together.
Figure 7B:
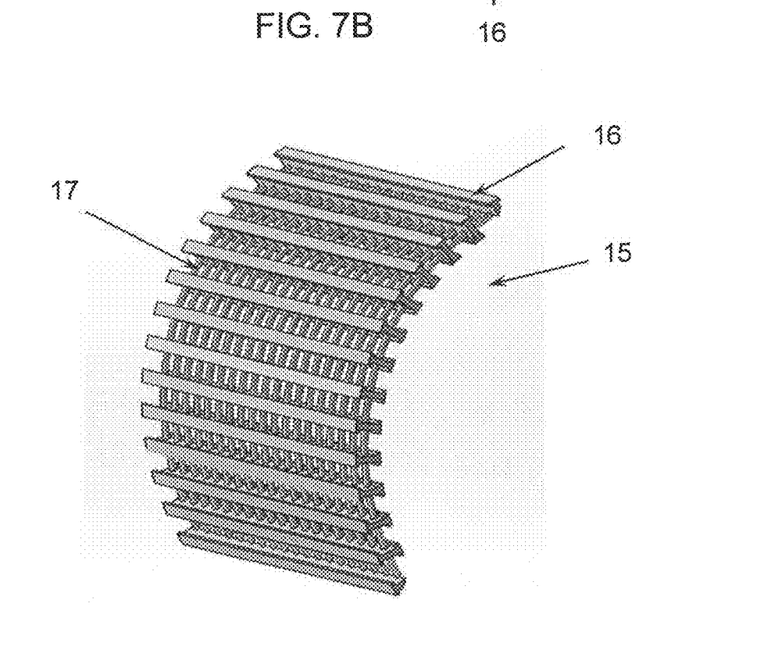
Figure 7C:
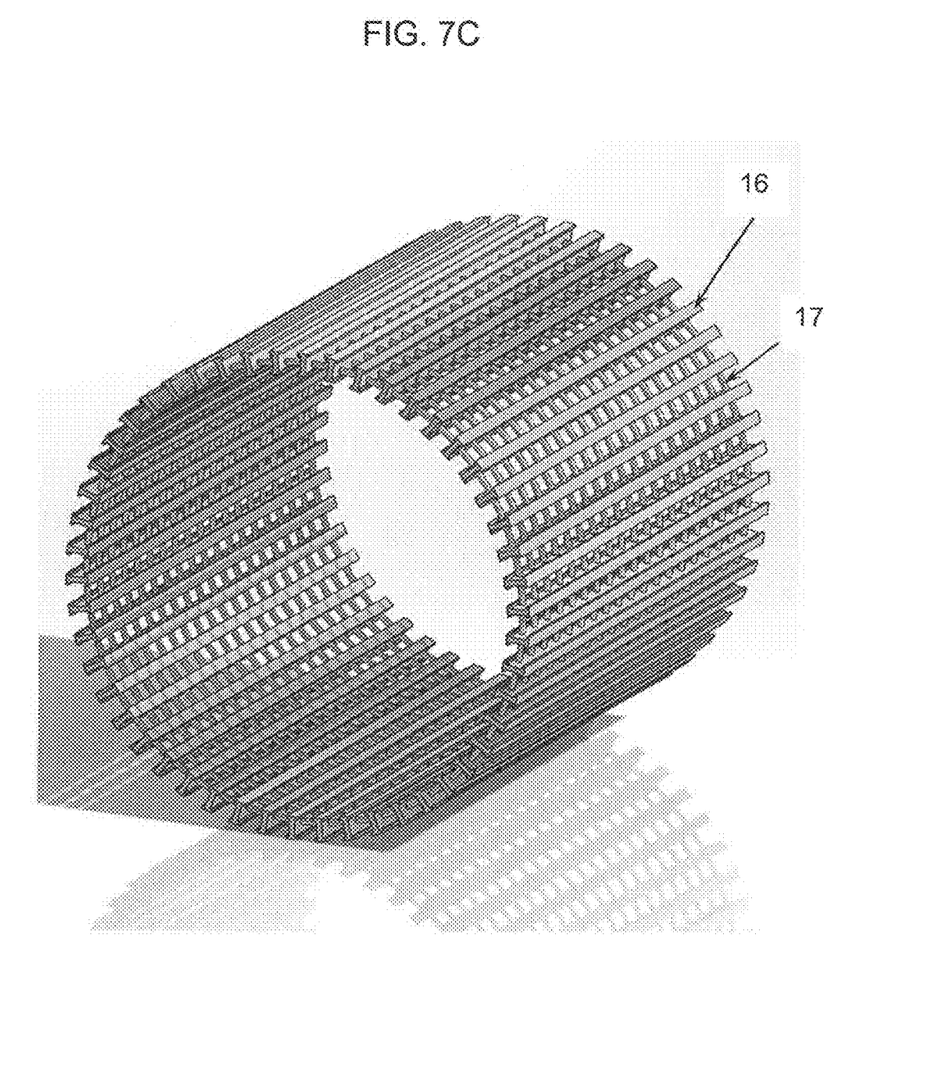

According to an exemplary embodiment, for example, as depicted in FIGS. 7A-C, a grating sheet 15 is first formed, which can be in accordance with a typical pultruded fiberglass grating structure, as shown for example in FIG. 7A. In some embodiments, the size of the grating sheet is 4' widths, which is in accordance with conventional pultruded fiberglass gratings, thereby allowing for the use of existing apparatus and methods for manufacturing the present structure, with the modifications noted above so as to allow for bending of the structure. As shown in FIG. 7B, each grating sheet 15 can then be bent to provide a curve which makes up any portion of a circular shape, such as a semicircle. Multiple curved grating sheets can then be combined and to form a full circular shape, thereby forming a tubular structure as depicted in FIG. 7C. In order to provide the desired height of the tubular supports 5, 6, 7, 10, 11 (from the base of the housing to the top of the housing), a single grating structure could be formed so as to have the desired height or multiple grating structures could be shaped into tubular shapes and stacked on top of each other to provide the desired height.

According to the present method, by utilizing the pultruded fiberglass grating as a base structure, a low cost, readily manufactured, corrosion resistant tubular structure can be provided for use in forming the tubular supports 5, 6, 7, 10, 11 of the present radial flow air purification system 1. Once the tubular structures are formed from the gratings, a porous layer of material can be provided on the outer circumference of the tubular structure (and, if desired, also on the inner circumference) so as to allow air flow therethrough (i.e., through the resulting tubular support 5, 6, 7, 10, 11) while preventing the loss of adsorbent media therethrough. Any conventional porous material layers that are used in filtration systems can be utilized in the present system. Some examples include thin plastic sheets having a desired porosity, and thin non-corrosive metal sheets having the desired porosity. The porous layer of material can, in some embodiments, be provided in cylindrical form so that the tubular structure formed from the grating can be simply inserted therein. The porous layer can be adhered or otherwise secured to the tubular grating structure using any variety of mechanical type fasteners, or the size of the cylindrical porous layer can be designed so as to fit precisely about the outer circumference of the tubular grating (and thus, the tubular grating can be simply dropped within the cylindrical porous layer), and/or to fit precisely within the inner circumference of the tubular grating (and thus, the cylindrical porous layer can be simply dropped within the tubular grating). Alternatively, a flexible sheet of the porous layer can be wrapped about and/or within the outer and/or inner circumference of the tubular grating structure and adhered or otherwise fastened thereto.

Figure 6:
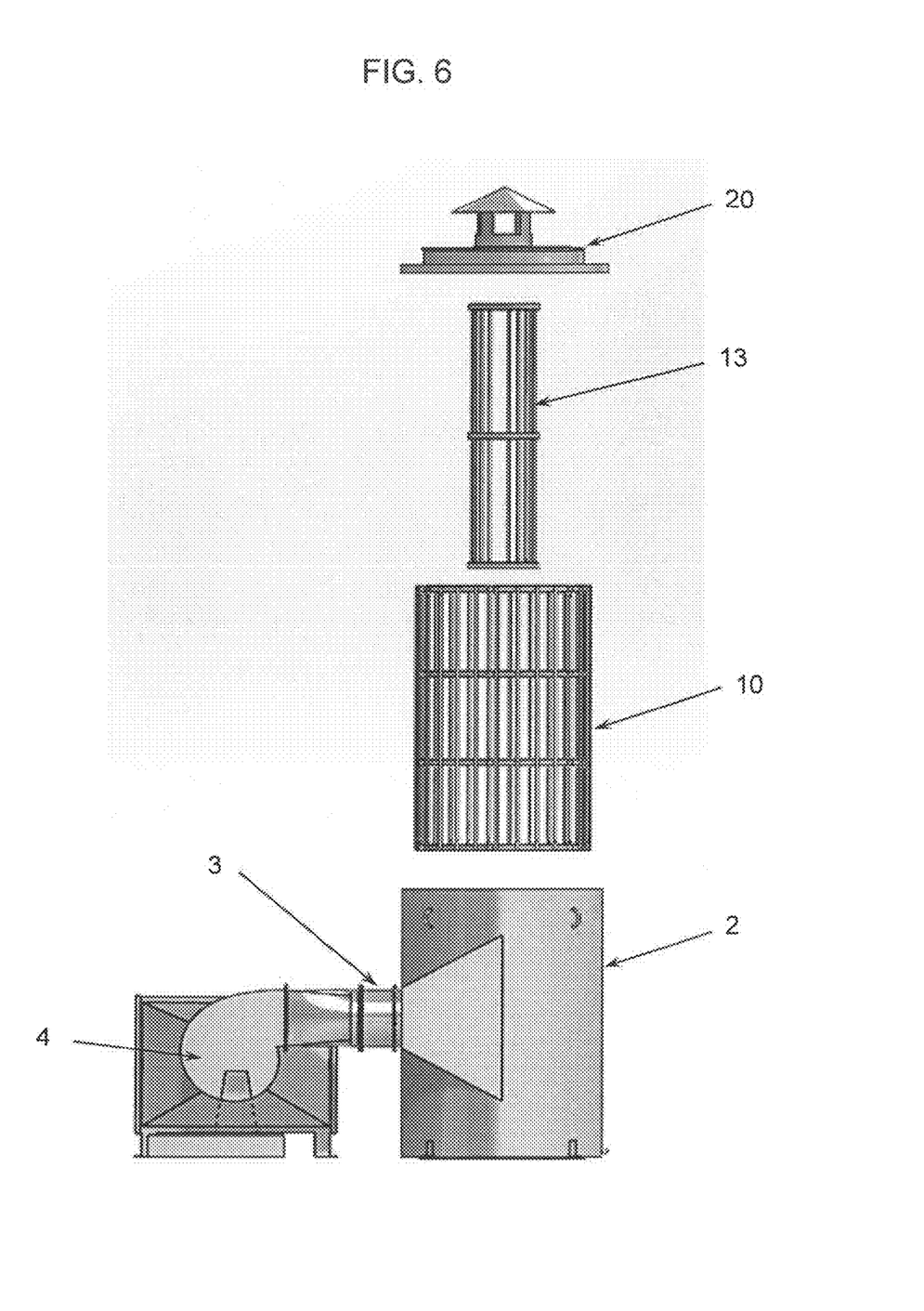
FIG. 6 illustrates an exploded view of a radial air purification system according to one embodiment of the present invention.

The various components are then assembled together to form the radial air purification system 1 of the present invention. For example, as depicted in FIG. 6, a cylindrical hollow housing 2 is provided with a top end open. The tubular supports in the desired number (e.g., three tubular supports 5, 6, 7 as in FIGS. 1B-C or two tubular supports 10, 11 as in FIG. 2, or even one tubular support as depicted in FIG. 6) are then placed inside of the housing 2. The tubular supports can be held securely within the housing 2 using any conventional techniques. For example, a base 21 of the housing 2 can have circular (or semicircular/any fraction of a circle) grooves (not shown) cut therein and/or circular (or semicircular/any fraction of a circle) protrusions (not shown) extending therefrom into or around which the tubular supports 5, 6, 7, 10, 11 are inserted and held. Various adhesives and/or mechanical fasteners could also be used together with the grooves and/or protrusions, or could be used in place of the grooves and/or protrusions to aid in holding the tubular supports 5, 6, 7, 10, 11 in place. An exit tube 13 can then be disposed within the innermost tubular support. In the embodiment of FIG. 6, where a single tubular support 7 is depicted, the adsorbent media could be disposed between the single tubular support land the exit tube 13. In addition, in some embodiments, a separate exit tube is not required to extend throughout the entire inner length of the housing 2 from the base 21 to the lid 20 but, rather, a tubular support can be provided to serve as the exit tube 13 extending from the base 21 to the lid 20. If desired, this tubular support could extend further upwards through and out of the lid or a separate tubular extension could extend from the lid 20 and upwards exterior of the housing. A top or lid 20 of the cylindrical hollow housing 2 could then be secured to the housing 2 to seal the housing 2. The housing is formed such that once the lid 20 is secured using any conventional securing and sealing techniques, the housing 2 provides an airtight container having an inlet through which the contaminated gas is fed (e.g., inlet tube 3 or the like), and eventually exits as a purified gas stream via the exit tube 13. As with the base 21 of the housing 2, protrusions, grooves, adhesives and/or mechanical fasteners could be provided in the lid 20 so as to hold the tops of the tubular supports 5, 6, 7, 10, 11 in place to ensure that the tubular supports extend concentrically within the housing. However, the tubular supports 5, 6, 7, 10, 11 typically have adequate strength and weight that it is not necessary to provide the protrusions, grooves, adhesives and/or mechanical fasteners to hold it properly in place. Once the lid 20 is secured to the housing, one or more adsorbent media (e.g., 8, 9, 12) can then be inserted into the appropriate locations between the tubular supports via the media inlets 14.

In order to purify a gas stream, one simply feeds the stream into the housing 2, typically in a tangential direction via an inlet tube 3 or the like, and the gas then proceeds through the radial purification system 1 where one or more contaminants are removed therefrom, yielding a purified gas stream that exits via the exit tube 13. Over time, one can simply replace the adsorbent media 8, 9, 12 by opening the lid 20 and removing remaining adsorbent media as needed, then inserting fresh adsorbent media 8, 9, 12 via the media inlets 14. Further, if any components within the housing become worn and require replacement, one can simply open the lid 20, remove the parts requiring replacement (e.g., porous layers, tubular supports), and replace the removed parts with fresh parts. In addition, the tubular supports 5, 6, 7, 10, 11 can be fabricated in any desired size and, thus, one can utilize an existing housing and remaining structures for an existing air purification system and can insert the present tubular supports 5, 6, 7, 10, 11 therein.

It will be apparent to those skilled in the art that various modifications and variations can be made to the structure of the present invention without departing from the scope or spirit of the invention.

In view of the foregoing, it is intended that the present invention cover modifications and variations of this invention provided they fall within the scope of the following claims and their equivalents.

What is claimed is:

1. A radial gas purification system, comprising:
    a hollow cylindrical housing having a circular base at a bottom, a circular lid at a top, and a side extending therebetween;
    a gas inlet in the side of the hollow cylindrical housing for feeding gas into the hollow cylindrical housing;
    a first outer tubular support disposed concentrically within the hollow cylindrical housing;
    a second inner tubular support disposed concentrically within the first outer tubular support;
    an adsorbent media space disposed between the first outer tubular support and the second inner tubular support;
    a purified gas outlet extending within the second inner tubular support and upwards through the circular lid; and
    the first outer tubular support and the second inner tubular support each comprising:
        at least one fiberglass grating formed into a circular shape to form a tubular structure, each of the at least one fiberglass grating comprising a first set of bars and a second set of bars, the first and second set of bars being interlaced, the first set of bars running parallel to each other, and the second set of bars running parallel to each other; and
        a porous layer disposed along an inner circumference of the tubular structure, along an outer circumference of the tubular structure, or along both the inner and outer circumferences of the tubular structure.

2. The radial gas purification system of claim 1, wherein the first outer tubular support comprises at least two pultruded fiberglass gratings, each pultruded fiberglass grating formed into a semicircular shape, with two semicircular shaped pultruded fiberglass gratings connected to form the first outer tubular structure.

3. The radial gas purification system of claim 1, wherein the second inner tubular support comprises at least two pultruded fiberglass gratings, each pultruded fiberglass grating formed into a semicircular shape, with two semicircular shaped pultruded fiberglass gratings connected to form the second inner tubular structure.

4. The radial gas purification system of claim 1, wherein the fiberglass gratings are pultruded, the first set of bars are I-bars, and the second set of bars are bearing bars.

5. The radial gas purification system of claim 3, wherein the first set of bars are I-bars, and the second set of bars are bearing bars.

6. The radial gas purification system of claim 1, wherein the first outer tubular support comprises a flat pultruded fiberglass grating having the first set of bars extending perpendicular to the second set of bars, the flat pultruded fiberglass grating being bent into the circular shape.

7. The radial gas purification system of claim 1, wherein the second inner tubular support comprises a flat pultruded fiberglass grating having the first set of bars extending perpendicular to the second set of bars, the flat pultruded fiberglass grating being bent into the circular shape.

8. The radial gas purification system of claim 7, wherein the fiberglass gratings are pultruded, the first set of bars are I-bars, and the second set of bars are bearing bars.

9. The radial gas purification system of claim 8, wherein the pultruded fiberglass gratings are bent along a length of the bearing bars.

10. A tubular support for supporting adsorbent media within a radial air purification system, comprising:
    at least one fiberglass grating formed into a circular shape to form a tubular structure, the at least one fiberglass grating comprising a first set of bars and a second set of bars, the first and second set of bars being interlaced, the first set of bars running parallel to each other, and the second set of bars running parallel to each other; and
    a porous layer disposed along an inner circumference of the tubular structure, along an outer circumferences of the tubular structure, or along both the inner and outer circumferences of the tubular structure.

11. The tubular support of claim 10, wherein the tubular support comprises at least two pultruded fiberglass gratings, each pultruded fiberglass grating formed into a semicircular shape, with two semicircular shaped pultruded fiberglass gratings connected to form the tubular structure.

12. The tubular support of claim 11, comprising a plurality of two semicircular shaped pultruded fiberglass gratings connected to form a length of stacked tubular structures.

13. The tubular support of claim 10, wherein the at least one fiberglass grating is pultruded, the first set of bars are I-bars, and the second set of bars are bearing bars.

14. The tubular support of claim 10, wherein a first outer tubular support comprises a flat pultruded fiberglass grating having the first set of bars extending perpendicular to the second set of bars, the flat pultruded fiberglass grating being bent into the circular shape.

15. The tubular support of claim 14, wherein the first set of bars are I-bars, and the second set of bars are bearing bars.

16. The tubular support of claim 15, wherein the flat pultruded fiberglass grating is bent along a length of the bearing bars.

17. A method of forming a tubular support for supporting adsorbent media within a radial air purification system, comprising:

forming at least one fiberglass grating into a circular shape to form a tubular structure, the at least one fiberglass grating comprising a first set of bars and a second set of bars, the first and second set of bars being interlaced, the first set of bars running parallel to each other, and the second set of bars running parallel to each other; and disposing a porous layer along an inner circumference of the tubular structure, along an outer circumference of the tubular structure, or along both the inner and outer circumferences of the tubular structure.

18. The method of claim 17, wherein the at least one fiberglass grating is formed by pultrusion.

19. The method of claim 18, wherein the first set of bars are formed into I-bars, a plurality of holes are formed within the I-bars, and the second set of bars are inserted through the plurality of holes.

20. The method of claim 17, wherein at least two pultruded fiberglass gratings are formed into a semicircular shape, and pairs of semicircular pultruded fiberglass gratings are connected to form the tubular structure.

21. The method of claim 18, wherein forming the at least one fiberglass grating into the circular shape comprises:

forming a flat pultruded fiberglass grating having the first set of bars extending perpendicular to the second set of bars; and bending the flat pultruded fiberglass grating into the circular shape.

22. The method of claim 21, wherein the first set of bars are I-bars and the second set of bars are bearing bars, and the flat pultruded fiberglass grating is bent into the circular shape along a length of the bearing bars.

* * * * *